United States Patent Office 3,272,291
Patented Sept. 13, 1966

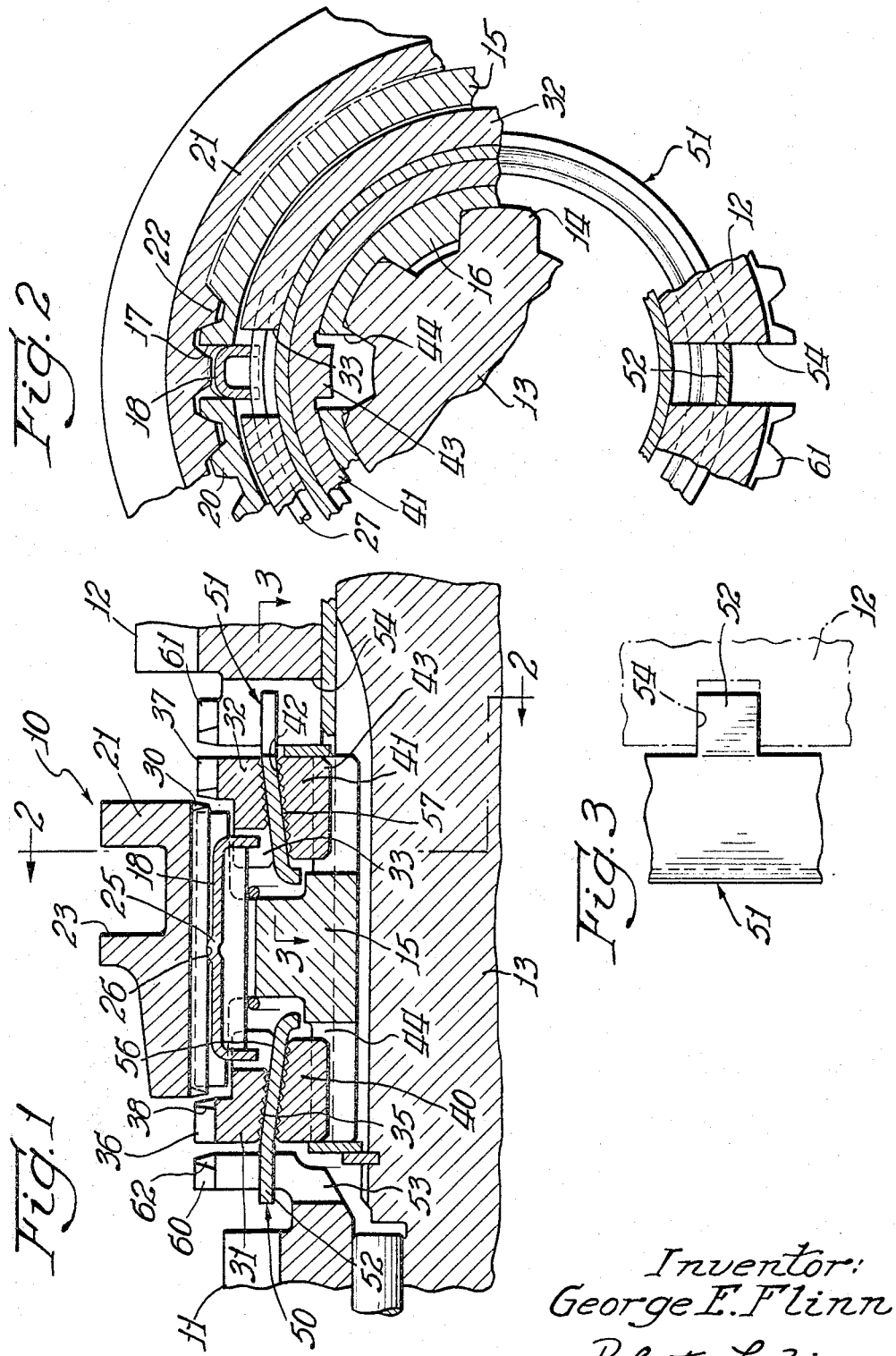
Sept. 13, 1966  G. E. FLINN  3,272,291
SYNCHRONIZER
Filed Aug. 3, 1964
Inventor:
George E. Flinn
By: Robert L. Zieg Atty.

3,272,291
SYNCHRONIZER
George E. Flinn, Muncie, Ind., assignor to Borg-Warner Corporation, a corporation of Illinois
Filed Aug. 3, 1964, Ser. No. 387,065
6 Claims. (Cl. 192—53)

This invention relates to a transmission synchronizer wherein a pair of relatively rotating transmission parts are brought into synchronization and are then drivingly connected together for transmission of torque.

One object of this invention is to provide an improved synchronizer structure of the type using blocking rings wherein thrust bars are used to apply thrust to the blocking rings when a clutch sleeve is moved, the blocking rings acting to establish a frictional driving connection between the parts to be brought into synchronization and a clutch sleeve is provided which is axially shiftable to establish a positive driving connection between the two relatively rotating parts after the parts are brought into synchronization by means of the frictional driving connection.

It is another object of the invention to provide an improved synchronizer of the type above described which utilizes a double conical clutch construction that affords a greatly increased frictional area without any increase in the diameter of the cone clutch.

It is a further object of the present invention to provide an improved synchronizer having a greatly increased torque capacity due to the use of a double conical clutch construction.

The invention consists of the novel constructions, arrangements and devices to be hereinafter described and claimed for carrying out the above stated objects and such other objects as will be apparent from the following description of the preferred form of the invention illustrated with reference to the accompanying drawings wherein:

FIGURE 1 is an axially sectional view through a transmission synchronizer embodying the invention;

FIGURE 2 is a view partially in cross-section taken as indicated by the line 2—2 of FIGURE 1; and FIGURE 3 is a view taken along the line 3—3 of FIGURE 1.

In the known type of transmission synchronizers wherein a cone clutch is provided to establish the frictional driving connection for bringing relatively rotating members into synchronization such as that illustrated in the patent to White et al. No. 2,221,900 issued November 19, 1940, the blocking rings such as member 29 in FIGURE 1 of the mentioned patent are provided with one clutch surface which engages with the conical clutch surface provided on the gear 19 as indicated by numeral 32. With this type of synchronizer structure it is difficult to adapt the synchronizer for transmission of increased torques. The known methods of providing the increased torque capacity consist mainly of increasing the diameter of the friction clutch parts of the synchronizer to provide a torque arm of increased radius for the friction clutch with reference to the axis of the gears to be brought into synchronization.

It will be apparent that limitations exist in attempting to increase the diameter of the synchronizer parts since it would require a larger transmission case and therefore take more space within a vehicle.

With applicant's improved synchronizer structure increased torque capacity is obtained by means of doubling the effective frictional clutch area as opposed to doubling or increasing the radius of the parts. The clutch area is doubled by the use of a double cone clutch construction wherein two conical clutch members on one part of the synchronizer receive a conically shaped member between them and when pressure is applied to engage the friction clutch the clutching will take place along two conical surface areas as compared to conventional synchronizers where the clutching takes place along a single conical clutch area.

Referring to FIGURE 1, the synchronizing assembly 10 is illustrated as used in a transmission including gears or rotatable parts 11 and 12 and a shaft 13. The shaft 13 is provided with splines 14. A hub or torque transmitting member 15 is provided including splines 16. The splines 16 of the hub 15 engage splines 14 on shaft 13 and drivingly connect the hub and the shaft.

The hub 15 has three slots 17 provided therein. Received within the slots 17 are thrust bars 18. External splines 20 are provided on the hub 15. A clutch sleeve 21 is provided which has internal splines 22 which engage with the splines 20 of the hub 15 to provide a driving connection. The clutch sleeve 21 has a circumferential groove 23 provided therein to receive a shifting fork (not illustrated).

The thrust bars 18 have a raised portion 25 which is engaged within a circumferential inner groove 26 cut in the clutch sleeve. Circular wire springs 27 are provided which urge the thrust bars 18 radially outwardly into engagement with the clutch sleeve 21.

The internal splines 22 of the clutch sleeve are provided with a chamfer at each end as indicated at 30.

Blocking rings or first synchronizer elements 31 and 32 are provided on either side of the torque transmitting member or hub 15 and have slots 33 cut therein to receive the ends of the thrust bars 18. The thrust bars thus drivingly connect the blocking rings 31 and 32 with the hub or torque transmitting member 15. The blocking rings 31 and 32 are provided with an inner conical clutch surface 35 which is threaded as indicated in the drawing to provide improved lubrication. The blocking rings 31 and 32 have external clutch teeth 36 and 37 respectively which are chamfered as indicated at 38.

The hub member is provided with slots 44. Disposed on either side of the hub 15 are clutch rings or second synchronizer elements 40 and 41 which have external conical surface 42 thereon which is complementary to the conical surface 35 on the blocking rings 31 and 32. The clutch rings 40 and 41 have driving lugs 43 thereon which are received in slots 44 provided in the hub 15. Thus the clutch rings 40 and 41 are also drivingly connected to the hub or torque transmitting member 15.

Friction clutch drums 50 and 51 are provided on either side of the hub 15 which are drivingly connected to the gears 11 and 12. The clutch drums 50 and 51 each have three driving lugs 52 which are received in slots 53 in the gear 11 and slots 54 in the gear 12. The clutch drums 50 and 51 have an external conical clutch surface 56 adapted to be engaged by the clutch surface 35 on the blocking rings 31 and 32 and an internal conical clutch surface 57 adapted to be engaged by the conical surface 42 on the clutch rings 40 and 41.

External teeth 60 are provided on the gear 11 and external clutch teeth 61 are provided on the gear 12, which are adapted to be engaged by the internal teeth 22 of the clutch sleeve when either of the gears 11 or 12 are to be drivingly connected to the shaft 13. External teeth 60 and 61 are chamfered as indicated at 62.

The relation between the slot 54 provided in the gear 12 and the respective clutch drum 51 is such that a certain amount of axial movement of the clutch drum 51 toward or away from the gear 12 is possible as best illustrated in FIGURE 3. Similarly, the clutch drum 40 which is drivingly connected to the gear 11 may move in an axial direction toward or away from the gear 11.

The operation of the synchronizer of the present invention is as follows: when the clutch sleeve 21 is moved to the left to engage the gear 11 the thrust bars 18 will move therewith to bear against and urge the blocking ring 31 to the left which will have the effect of engaging the clutch surface 35 on the blocking ring 31 with the clutch surface 56 on the clutch drum 50 and will also engage the clutch surface 42 on the clutch ring 40 with the clutch surface 57 on the clutch drum 50.

This intial engagement will cause the blocking ring 31 and the clutch ring 40 to turn with the gear 11 and thus cause a relative rotation between the blocking ring 31 and the hub or torque transmitting member 15 in the direction of the movement of the part which is rotating at a greater speed, thus causing the chamfered surfaces of the teeth 36 of the blocking ring 31 and teeth 22 on the clutch sleeve 21 to move into blocking register. Once the blocking ring moves into blocking register continued movement of the clutch sleeve 21 will be resisted by the chamfered surfaces of the teeth 36 even though considerable force is applied to the clutch sleeve 21 tending to cause it to move into its desired positive engagement with teeth 60 on the gear 11. Therefore a resistance to positive clutch engagement will exist until the gear 11 arrives at a synchronous speed with the clutch sleeve 21 at which point there will be a relative reversal of movement causing the blocking ring 31 to move to a position where the teeth 36 on the blocking ring are in register with the internal teeth 22 on the clutch sleeve 21. When such a position is assumed, there will be no further resistance to movement of the clutch sleeve 21 and it may therefore be urged onwardly into positive clutch engagement with the teeth 60 on the gear 11, the yielding connection between the thrust bars 18 and the clutch sleeve 21 breaking away under the force applied to move the clutch sleeve 21. A positive clutching action is now provided between the clutch sleeve and the gear 11 and the gear 11 is engaged.

The operation is of course the same as above when moving the clutch sleeve to the right to engage the gear 12.

From the foregoing description it will be apparent that the friction clutching action of the synchronizer takes place by the engagement of a double conical clutch structure as, for example, between the clutch surface 35 and the clutch surface 56 and between the clutch surface 42 and the clutch surface 57 when engaging the gear 11. Therefore, without increasing the diameter of the gears used, or the diameter of the parts of the synchronizer, the torque capacity of the synchronizer is approximately doubled since two separate pairs of clutching surfaces are engaged when synchronizing prior to engagement of either of the gears. The clutch surface area is thus approximately double that of the clutch surface area in the known type of synchronizer utilizing blocking rings such, for example, that shown in the above mentioned patent to White et al., No. 2,221,900.

It will be apparent that the novel and improved synchronizer structure of the present invention provides a unique and simple solution to the problem of increasing the torque capacity of a synchronizer mechanism without increasing the diameters of the friction clutch or other parts of the synchronizer structure.

While this invention has been described in connection with certain specific embodiments it is to be understood that this is by way of illustration and not by way of limitation and the scope of this invention is defined solely by the appended claims which should be construed as broadly as the prior art will permit.

I claim:

1. In a transmission synchronizer, a torque transmitting member, a rotatable part adjacent said torque transmitting member, a first synchronizer element drivingly connected to said torque transmitting member and shiftable axially for establishing a frictional driving connection between said member and said rotatable part to be synchronized therewith, a second synchronizer element drivingly connected to said member, clutch means encircling said member and drivingly connected thereto, said clutch means being shiftable axially to establish a positive driving connection between said member and said part, means drivingly connected to said part and extending between said first and second synchronizer elements and said sychronizer elements being engageable with said means to establish said frictional driving connection.

2. In a transmission synchronizer, a torque transmitting member, a rotatable part adjacent said torque transmitting member, a first synchronizer element drivingly connected to said member and shiftable axially for establishing a frictional driving connection between said member and said rotatable part to be synchronized therewith, a second synchronizer element drivingly connected to said member, clutch means encircling said member and drivingly connected thereto, said clutch means being shiftable axially to establish a positive driving connection between said member and said part, friction clutch means drivingly connected to said part and extending between said first and second synchronizer elements and said friction clutch means being engageable by said synchronizer elements to establish said frictional driving connection.

3. In a transmission synchronizer, a torque transmitting member, a rotatable part adjacent said torque transmitting member, a first synchronizer element having a clutch surface thereon and drivingly connected to said torque transmitting member and shiftable axially to establish a frictional driving connection between said member and said rotatable part to be synchronized therewith, a second synchronizer element having a clutch surface thereon and drivingly connected to said member, clutch means encircling said member and drivingly connected thereto, said clutch means being shiftable axially to establish a positive driving connection between said member and said part, friction clutch means drivingly connected to said part and extending between said first and second synchronizer elements and said friction clutch means being engageable with said clutch surfaces on said first and second synchronizer elements to establish said frictional driving connection.

4. In a transmission synchronizer, a torque transmitting member, a rotatable part adjacent said torque transmitting member, a first synchronizer element drivingly connected to said torque transmitting member and having a conical clutch surface thereon and shiftable axially for establishing a frictional driving connection between said member and said rotatable part to be synchronized therewith, a second synchronizer element having a conical clutch surface thereon complementary to the clutch surface on said first synchronizer element and being drivingly connected to said torque transmitting member, a clutch sleeve encircling said member and drivingly connected thereto, said sleeve shiftable axially to establish a positive driving connection between said member and said part, clutch means drivingly connected to said rotatable part and extending between said first and second synchronizer elements and having two conical clutch surfaces thereon, said two clutch surfaces on said clutch means being engageable with said complementary conical clutch surfaces on said synchronized elements to establish said frictional driving connection when said sleeve is shifted axially.

5. In a transmission synchronizer, first and second relatively rotating and adjacent parts to be brought into synchronization, a friction clutch mechanism engageable to interconnect said pairs, a positive clutch mechanism engageable to drivingly connect said parts when said parts are in synchronization, said friction clutch mechanism including first and second synchronizer elements drivingly connected to one of said parts, said synchronizer elements having complementary clutch surfaces thereon, means rotatably fixed to said other part and extending between said synchronizer elements, said means having clutch surfaces thereon engageable by said complementary clutch surfaces on said synchronizer elements to establish a frictional driving connection between said parts.

6. In a transmission synchronizer, first and second relatively rotating parts to be brought into synchronization, a friction clutch mechanism engageable to interconnect said parts, a positive clutch mechanism engageable to drivingly connect said parts after said parts are in synchronization, said friction clutch mechanism including first and second synchronizer elements each having a conical clutch surface thereon and each drivingly connected to one of said parts, said conical clutch surfaces on said synchronizer elements being complementary, means rotatably fixed to said other part and extending between said synchronizer elements, said means having two conical clutch surfaces thereon engageable by said complementary clutch surfaces on said synchronizer elements.

References Cited by the Examiner
UNITED STATES PATENTS 2,267,452 12/1941 Fishburn.
2,380,559 7/1945 Tyken.
2,571,474 10/1951 Ochs et al.

DAVID J. WILLIAMOWSKY, *Primary Examiner.*

A. T. McKEON, *Assistant Examiner.*